United States Patent [19]

Kunse

[11] Patent Number: 5,749,683

[45] Date of Patent: May 12, 1998

[54] DRY VAN TRAILER CONVERSION AND MATERIAL HANDLING METHOD

[75] Inventor: Thomas R. Kunse, Clare, Mich.

[73] Assignee: Northern Logistics, L.L.C., Clare, Mich.

[21] Appl. No.: 723,524

[22] Filed: Sep. 30, 1996

[51] Int. Cl.[6] .................................................. B65G 53/24
[52] U.S. Cl. ............................ 406/41; 406/43; 406/154
[58] Field of Search ............................. 406/39, 41, 43, 406/154, 163, 171, 175

[56] References Cited

U.S. PATENT DOCUMENTS

| | | |
|---|---|---|
| 1,301,427 | 4/1919 | Girtanner . |
| 1,528,549 | 3/1925 | Hoyt . |
| 1,690,380 | 11/1928 | Smith . |
| 1,707,206 | 3/1929 | Bernert ............................ 406/175 |
| 2,194,144 | 3/1940 | Gill . |
| 2,485,462 | 10/1949 | Sinnott . |
| 2,784,858 | 3/1957 | Gebhardt ........................... 406/39 |
| 3,580,644 | 5/1971 | Ballard ............................ 406/171 |
| 3,613,915 | 10/1971 | Vita . |
| 3,922,838 | 12/1975 | Kline et al. . |
| 4,147,392 | 4/1979 | Fuss .............................. 406/175 |
| 5,195,852 | 3/1993 | Malugani et al. . |
| 5,199,826 | 4/1993 | Lawrence . |

FOREIGN PATENT DOCUMENTS

4131038 A1  9/1993  Germany ............................ 406/171

*Primary Examiner*—Gary C. Hoge
*Attorney, Agent, or Firm*—Learman & McCulloch

[57] ABSTRACT

A conventional dry van trailer is modified to include a recessed bulkhead at the back of the trailer having a material inlet that communicates on its exterior side with a flexible fill tube and on its interior side with a rigid distribution conduit. The distribution conduit extends along the top wall of the trailer to an open free end near the front of the trailer. A bottom-opening distribution slot extends from the open free end of the conduit rearwardly along a substantial length of the trailer. The fill tube is connected to a grinder/blower unit which delivers a high velocity flow of ground plastic scrap into the tube and conduit is discharged therefrom through the open end and distribution slot of the conduit in a manner to fill the trailer from front to back. A two-stage coarse/fine filter permits air to escape from the trailer while retaining the solid material.

16 Claims, 2 Drawing Sheets

DRY VAN TRAILER CONVERSION AND MATERIAL HANDLING METHOD

This invention relates to material transport and storage systems and methods for receiving and transporting flowable, dry solids material in bulk.

BACKGROUND OF THE INVENTION

Various apparatus and methods are known for handling and storing flowable, dry solids materials in bulk. In the manufacture of plastic bag products for example, it is common practice to feed plastic film scrap that is generated during manufacturing to an on-site grinder/blower which shreds the scrap into fine sold particles and blows it into a large open-topped storage container, where it remains until further reprocessing or disposal, as the case may be.

One disadvantage with this disposal system is that the open container allows a certain amount of the material to escape and litter the environment around the container. Another disadvantage of the open container system is that is must be sheltered from the weather, thus taking up valuable floor space at the manufacturing facility.

The present invention overcomes or greatly minimizes all of these deficiencies.

SUMMARY OF THE INVENTION

A dry van conversion trailer comprises a conventional trailer body mounted on a wheeled carriage with a coupling for attaching the trailer to a towing vehicle. The body has an enclosed box construction with a floor, ceiling, side walls, a front, and at least one openable door at the back of the body for accessing the space within the body.

According to the invention, the otherwise conventional trailer body is modified to include a bulkhead installed within the body just forward of the back door to close off the space within the body. The bulkhead has a material inlet communicating with an external flexible fill tube whose free end is connectable with the discharge outlet of a grinder/blower for directing a high velocity flow of solids material through the fill tube and into the body of the trailer. An internal distribution tube is mounted within the body above the floor and coupled to the material inlet to receive the flow of the solids material. The distribution tube extends toward the front of the body and is open at its forward free end. A bottom opening slot extends from the open forward end of the tube rearwardly toward the back of the trailer body in order to distribute the material in such manner that it fills the space within the trailer from front to back.

The bulkhead has an air outlet to allow air to escape during filling of the trailer with the solids material. A two-stage filtering system is provided having a first coarse stage which separates out and retains within the body any relatively large sized particles carried by the exit air toward the outlet. Downstream of the coarse filter is a fine filter which filters out and retains relatively finer solids material, such that the air exiting the outlet is generally free of any of the solids material.

The trailer apparatus of the invention has several advantages over the prior open-topped containers. It is a mobile unit able to be readily transported about by means of a towing vehicle. The trailer of the invention is weather-tight, permitting the trailer to be parked outside of a facility rather than taking up valuable floor space indoors. The external fill hose of the invention is able to be coupled directly to a grinder/blower unit such that the material is dispensed directly into the trailer body, and then transported away, minimizing handling of the material. The interior distribution tube fills the trailer body with the material from front to back, thereby making efficient use of the space within the trailer.

The two-stage filter system prevents the escape of any solids material from the trailer during filling in an efficient manner. The coarse filter is preferably a permanent wire screen installation mounted within the trailer body and the fine filter is preferably a replaceable one mounted across the air outlet from the exterior side thereof for ease of replacement when spent. The filters work together in an efficient manner to cleanse the air exiting the trailer body such that it is free of any of the solid scrap material.

THE DRAWINGS

A presently preferred embodiment of the invention is disclosed in the following description and in the accompanying drawings, wherein:

FIG. 1 is a partial, rear prospective view of the preferred trailer construction; and FIG. 2 is a fragmentary longitudinal sectional view of the preferred trailer construction.

DETAILED DESCRIPTION

Figure 1:
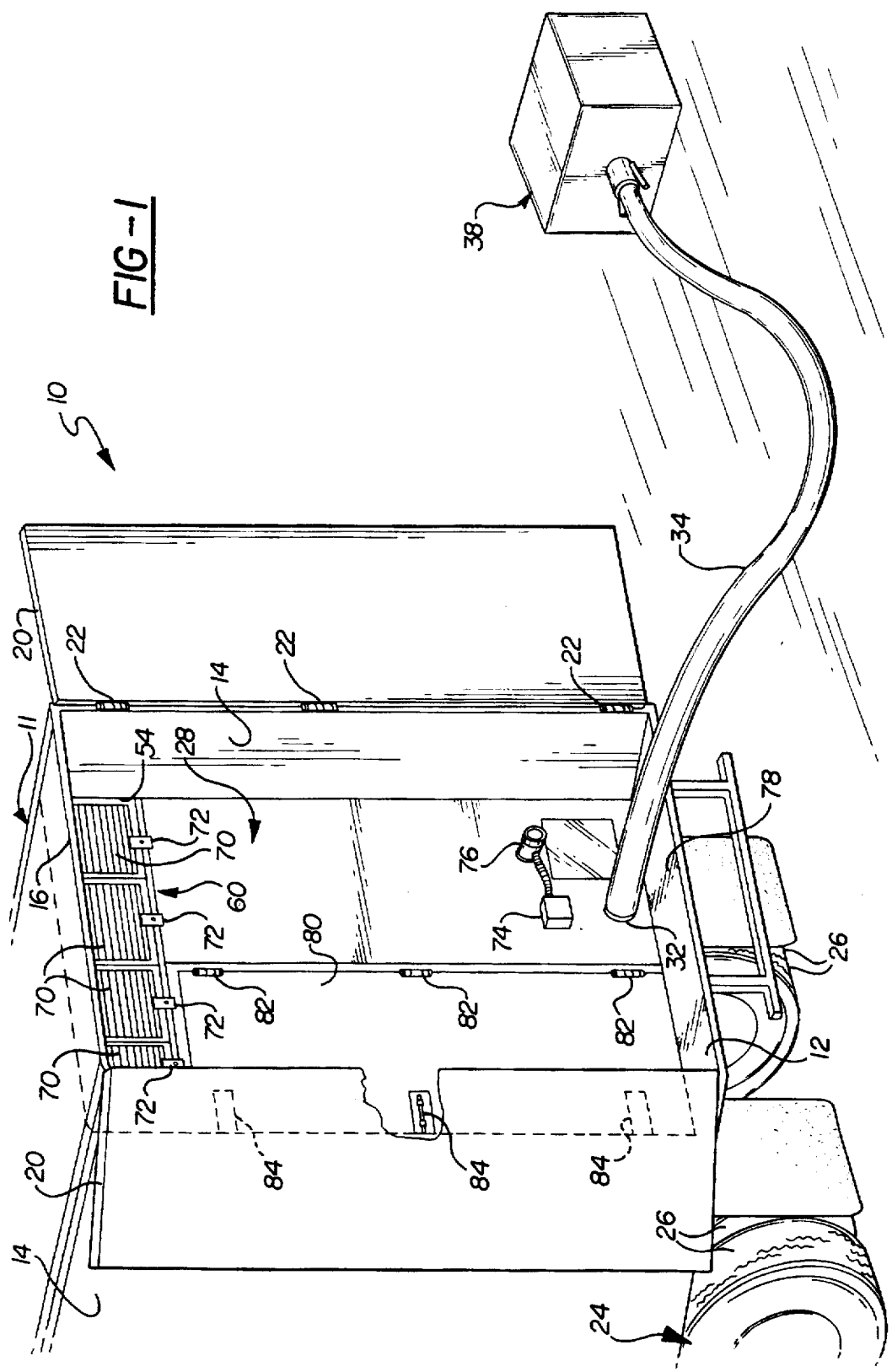
Figure 2:
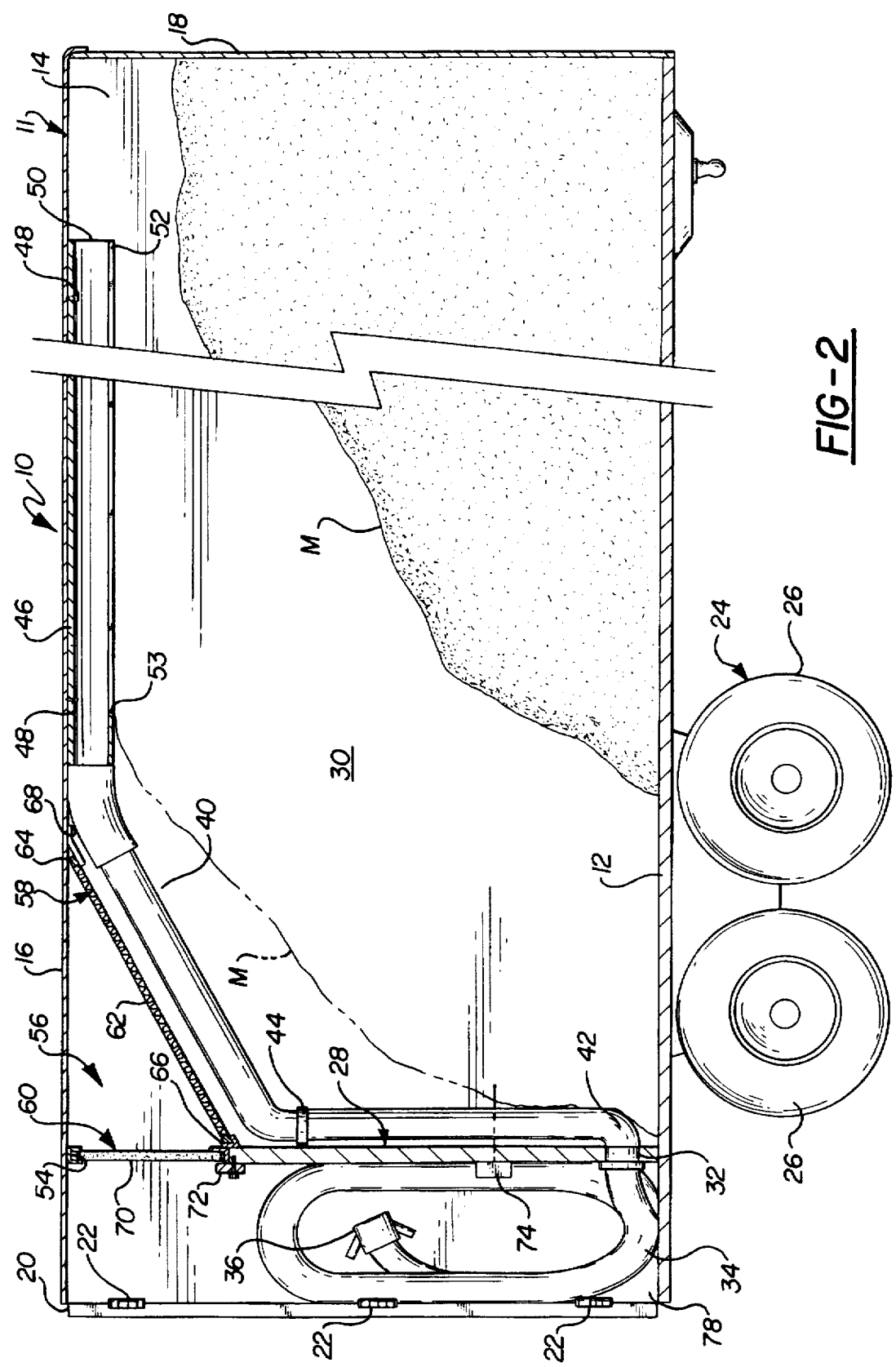

A dry van conversion trailer constructed according to a presently preferred embodiment of the invention is designated generally at 10 in the drawings and comprises a weather-tight, box-like trailer body 11 like that of a conventional semi-trailer trailer van body having a solid floor 12, opposing spaced side walls 14, a top ceiling wall 16 opposite the floor 12, a front wall 18 at the front or nose of the trailer 10, and one or more rear doors 20 secured by hinges 22 to the side walls 14 for movement between opened and closed positions, shown in FIGS. 1 and 2, respectively. A wheel carriage 24 supports the body 11 adjacent its back end and includes one or more sets of wheels 26 to render the trailer mobile. A hitch coupling 28 is mounted on the body 11 adjacent its front end for attachment in conventional manner to a towing vehicle, such as a semi-tractor. According to the invention, a bulkhead wall 28 is constructed of such size and shape to conform to the size and shape of the transverse cross section of the interior of the trailer body 11. As shown in the drawings, the bulkhead 28 is installed within the otherwise conventional body 11 in forwardly recessed relation to the rear doors 20. The bulkhead 28 extends the full width and height of the body 11, completely closing off the back of the body 11, and isolating an enclosed weather-tight space 30 within the body 11 to receive and transport flowable solids material, as will be described in greater detail below.

The bulkhead 28 is formed with a material inlet opening 32 for receiving flowable, dry solids material into the enclosed space 30. An exterior flexible fill tube 34 communicates at one end thereof with the material inlet 32 and extends therefrom to an opposite free end 36 that is preferably fitted with a quick connection cam-type pipe coupling such as those available commercially from Morris Coupling Company, for attachment to the discharge outlet of an on-site grinder/blower unit 38.

An interior distribution conduit 40 is installed stationary within the interior 30 of the body 11. The conduit 40 comprises rigid tubing coupled at an inlet end 42 thereof to the material inlet 32 of the bulkhead and extending generally vertically upwardly therefrom along the interior side of the bulkhead 28 and secured thereto by a suitable clamp 44. From the bulkhead 28, the conduit 40 angles forwardly to a straight run section 46 that extends longitudinally forwardly of the body 11 along the top wall 16 and is mounted thereto by means such as fasteners 48 or other suitable mounting hardware. The conduit terminates at a forward free end 50 adjacent the front wall 18 the trailer 10. As shown in FIG. 2, the free end 50 is open. As also shown, a longitudinal distribution slot 52 is provided along the bottom of the conduit 40 and extends from the open free end 50 of the conduit rearwardly of the body 11 generally the full length of the straight run section 46 to a closed end 53. In the preferred embodiment, the conduit 40 has about a 6 inch inner diameter and the longitudinal distribution slot 52 is approximately 1 inch wide and extends from the free end 50 continuously rearwardly along the straight run section 46 to a point about a few feet forwardly of the bulkhead 28 where the conduit 40 angles downwardly toward the bulkhead 28. It will be understood that the distribution slot 50 could also comprise a plurality of openings along the bottom of the conduit 40 rather than one continuous opening, but the latter is preferred since it is less suscepttible to blockage by the material as it travels along the conduit 40.

The bulkhead 28 is provided with an air outlet 52 that extends preferably across the top margin of the bulkhead 28 adjacent the top wall 16 of the trailer body 11 to provide and escape for air during filling of the enclosed space 30 with dry solids material.

A filter system 56 is provided for filtering out any solids material from the air stream exiting the trailer body 11 through the outlet 54. In the preferred embodiment, the filter system 56 comprises at least a two-stage filter system including a first course filter stage 58 for filtering out relatively coarse fractions of solids material entrained with the air exiting the outlet 54, and a second fine filter stage 60 down flow of the first filter 58 for filtering out relatively finer fractions of the entrained solids from the air stream. It is preferred that the coarse filter 58 be a generally permanent installation whereas the fine filter 60 be replaceable.

As shown in FIG. 2, the coarse filter 58 extends preferably between the side walls 14 of the body 11 from a point along the bulkhead just below the outlet 54 and from there extends forwardly and upwardly at about a 30° angle to the top wall 16 at a point where the straight run section 46 angles downwardly from the top wall 16. The coarse filter 58 preferably comprises woven wire fabric screen 62 mounted on a rigid screen frame 64 that is held in position against the bulkhead 28 and top wall 16 by mounting brackets 66 and 68, respectively. The mesh of the screen 62 governs its coarseness, but it has been found that ordinary household window screen works well as a filter for ground plastic film scrap material. The angled relation of the coarse screen 58 maximizes its exposure area and lessens the opportunity for the screen 58 to load up or become completely blocked by the solids material during filling.

The fine filter 60 comprises at least one and preferably a plurality of replaceable filter elements 70. Standard, disposal household furnace filters have shown to work well and preferably the type having fiberglass filter media. The elements 70 are mounted in a framed opening of the air outlet 54 from the exterior side of the bulkhead 28 and are held releasably in place by means such as turn buttons 72 or the like to provide rapid and convenient installation and removal of the filter elements 70. In the preferred construction, the fine filter 60 provides about 8 ft$^2$ of filter surface and allows less than 0.1 lbs. of solids material to exit the outlet 54 per 1000 lbs. of exit air.

According to a preferred method of the invention for filling the body 11 with ground plastic film scrap material M. The trailer 10 is transported by a suitable towing vehicle to the location where the material is to be loaded and may, if preferred, be detached from the towing vehicle and left outdoors adjacent the loading site. The weather-tight trailer body 11 and bulkhead 28 protects the interior of the trailer from inclement weather conditions.

Once on site, the rear doors 20 of the trailer 10 are opened and the exterior flexible fill tube 34 is extended from the trailer and its free end 36 attached to the outlet of the grinder/blower unit 38. The unit 38 is of the type used by manufacturers of plastic film products, such as plastic bags, for grinding plastic film scrap into fine solid particles which are discharged from the unit 38 as a high velocity stream. The stream of particles is directed into the fill tube 34, conveyed along the internal distribution conduit 40 and discharged into the enclosed space 30 through the open free end 50 and distribution slot 52 of the conduit 40.

During initial filling, the momentum of the high velocity flow of the material M carries a majority of the material the full length of the section 46 such that it is discharged primarily through the open free end 50, causing an initial build up or accumulation of the material M to accumulate within the space 30 toward the front or nose of the trailer body 11. As the material continues to accumulate, it reaches a level where it begins blocking off and preventing further flow through the open free end 50. Such blocking causes the subsequent flow of material to be directed out of the conduit 40 through the distribution slot 52. It too becomes blocked by the accumulating material M, but progressively toward its closed end 53, causing the enclosed space 30 to be filled with the material M from front to back as illustrated in FIG. 2, providing efficient, complete filling of the space 30.

A high level indicator 74 is mounted on the bulkhead 28 and is coupled to readout gauge 76 for sensing the accumulation of material M in relation to the amount of space available within the body 11. A viewing window 78 is also provided in the bulkhead 28 to permit visual inspection of the space 30 from outside of the body 11.

As the material M enters the space 30, air is vented out of the trailer body 11 through the outlet 54 to atmosphere. Prior to its exiting the outlet 54, the air must pass through the filters 58,60 where the entrained solids material M is separated out from the air and retained within the body 11 as mentioned above.

Once the space 30 is filled with the material M, as illustrated by the broken chain lines in FIG. 2, the exterior fill tube 34 may be disconnected from the grinder/blower unit 38 and stowed in the space 78 provided between the bulkhead 28 and the doors 20 when the doors 20 are closed 95 illustrated in FIG. 2. The trailer 10 may then be coupled to a towing vehicle and transported to a predetermined disposal site for unloading of the material M.

For purposes of unloading the material M, the bulkhead 28 is provided with an access door 80 mounted by hinges 82 along one edge thereof and normally held closed by latches 84 along its opposite edge. To gain access to the space 30, the latches 84 may be unlocked and the door 80 swung open, after which the material M may be withdrawn from the space 30 by any suitable means such as a commercial vacuum unloader (not shown). Once unloaded, the trailer 10 may be reconditioned for use by cleaning any debris off the screen 62 of the coarse filter 58 and replacing the filter elements 70 of the fine filter 60 with new elements 70.

The disclosed embodiment is representative of a presently preferred form of the invention, but is intended to be illustrative rather than definitive thereof. The invention is defined in the claims.

I claim:

1. A trailer construction for receiving and transporting flowable dry solids material in bulk, comprising:
   an elongate dry van trailer body having a bottom wall, a top wall, a pair of side walls, a front wall, and at least one closable back door;
   a wheel carriage supporting said trailer body;
   a bulkhead adjacent the back of said trailer body enclosing an interior space within said trailer body, said bulkhead having a material inlet and an air outlet;
   an exterior flexible fill tube having a first end coupled to said material inlet of said bulkhead and an opposite free end connectable to a source of pressurized flowable dry solids material so as to direct a high velocity flow of such material through said exterior fill tube and into the interior of said trailer body;
   an integral interior distribution conduit supported by said trailer body within the interior of said trailer body and coupled at one end thereof to said material inlet, said conduit extending longitudinally forwardly of said inlet above said bottom wall to an open end adjacent said front wall of said trailer body, said conduit including a longitudinal material distribution opening extending rearwardly from said open end of said conduit to a closed rearward end of said opening adjacent said back of said trailer so as to discharge the high velocity flow of material from said conduit in a manner to fill said trailer generally from front to back; and
   a filter system arranged between said interior of said trailer and said air outlet of said bulkhead to permit the passage of air therethrough out of said trailer through said air outlet while preventing the escape of the solids material from through said air outlet.

2. The trailer construction of claim 1 wherein said material discharge opening comprises a slot extending substantially continuously from said open end of said conduit to said closed rearward end.

3. The trailer construction of claim 1 wherein said conduit is mounted on said top wall of said trailer body and said material discharge opening is provided along a bottom portion of said conduit.

4. The trailer construction of claim 3 wherein said material discharge opening comprises a longitudinal slot extending substantially continuously from said open end of said conduit to said closed rearward end of said discharge opening.

5. The trailer construction of claim 1 wherein said filter system comprises a first stage coarse filter mounted within said trailer body for separating out and retaining within said trailer body a relatively coarse fraction of any solids material entrained with the air flowing toward said air outlet, and a second stage fine filter arranged downstream of said coarse filter for separating out and retaining within said trailer a relatively finer fraction of any solids material entrained with the air passing through said course filter and exiting said air outlet.

6. The trailer construction of claim 5 wherein said air outlet is provided along a top portion of said bulkhead, said first stage filter extending at an angle between said bulkhead and said top wall.

7. The trailer construction of claim 6 wherein said first stage filter comprises screen cloth.

8. The trailer construction of claim 5 wherein said second stage filter comprises a fibrous media filter disposed across said air outlet of said bulkhead.

9. The trailer construction of claim 8 wherein said second stage filter is mounted releasably on said bulkhead to permit replacement of said second stage filter.

10. The trailer construction of claim 1 wherein said bulkhead is spaced forwardly of said doors defining a storage compartment therebetween.

11. A trailer construction for receiving and transporting flowable solids material in bulk, comprising:
    an elongate trailer body having a bottom wall, a top wall, a pair of side walls, a front wall, and at least one closable back door;
    a wheel carriage supporting said body;
    a hitch coupling enabling attachment of said trailer to a towing vehicle;
    a bulkhead adjacent the back of said trailer body enclosing an interior weather-tight space within said trailer body, said bulkhead having a material inlet and including an air outlet adjacent a top of said bulkhead;
    an exterior flexible fill tube having a first end coupled to said material inlet of said bulkhead and an opposite free end connectable to a source of pressurized flowable dry solids material to direct a high velocity flow of such material through said exterior fill tube;
    a rigid interior distribution conduit mounted stationarily within the interior of said body having one end thereof coupled to said material inlet of said bulkhead to receive the high velocity flow of the material into said conduit and extending therefrom longitudinally forwardly along said top wall to an open free end adjacent said front wall of said trailer body, said conduit having a material distribution slot provided along a bottom portion of said conduit extending continuously from said open end rearwardly of said trailer body to a closed end of said slot adjacent said bulkhead so as to discharge the high velocity flow of material from said conduit into said space in a manner to fill said space progressively from front to back; and
    a two-stage filter system including a first coarse filter mounted within said trailer body extending laterally between said side walls and rearwardly and upwardly at an angle between said bulkhead and said top wall to filter out and retain within said trailer body a relatively coarse fraction of the solids material carried by the air toward said air outlet, and a second fine filter extending across said air outlet downstream of said first coarse filter to filter out and retain a relatively finer fraction of the solids material that passes through said first filter and is carried by the air toward said air outlet.

12. A method of converting a conventional dry van trailer to facilitate the receipt and handling of flowable dry solids material in bulk, the trailer including a body having a bottom wall, a top wall, a pair of side walls, a front wall, at least one closable back door, and a wheel carriage supporting the body, said method comprising the steps of:
    mounting a bulkhead at the back of the trailer to enclose an interior space within the trailer for receipt and storage of the material;
    providing the bulkhead with a material inlet;
    coupling one end of a flexible exterior fill tube to the material inlet and providing an attachment at an opposite free end to permit attachment of the fill tube to a source of pressurized flowable dry solids material so as to direct a high velocity flow of such material through the fill tube;
    mounting a distribution conduit within the interior of the body above the bottom wall with one end thereof coupled to the material inlet to receive the high velocity flow of material into the conduit and an opposite end arranged adjacent the front of the trailer;

providing a material discharge opening commencing at said opposite end of the conduit and extending longitudinally toward the back of the body to discharge the material from the conduit in such manner as to fill the interior with the material generally from front to back;

providing an air outlet opening adjacent a top of the bulkhead to permit air to escape from the interior of the body during filling of the material; and mounting a multiple stage filter system between the interior of the body and the air outlet to filter out and retain within the body any of the solids material carried by the air toward the air outlet such that the air exiting the trailer body is substantially free of such solids material.

13. A method of handling dry plastic scrap generated by a manufacturing facility equipped with a grinder/blower unit into which such scrap is fed and ground into finer flowable solid particles and discharged as a high velocity stream of such ground material through an outlet of the unit, said method comprising the steps of:

modifying a conventional dry van trailer having a trailer body with a bottom wall, a top wall, a pair of side walls, a front wall, at least one closable back door, and a wheel carriage that supports the trailer body by (a) mounting a bulkhead at the back of the trailer to enclose an interior space within the trailer, (b) providing a material inlet in the bulkhead, (c) coupling one end a flexible exterior fill tube to the material inlet of the bulk head and providing the opposite free end of the fill tube with a coupling that is attachable to the discharge outlet of the grinder/blower unit, (d) mounting a rigid distribution conduit within the interior of the trailer body such that one end of the conduit is coupled to the material inlet and the conduit extends from the material inlet forwardly of the trailer body along the top wall to an open free end adjacent the front wall of the trailer body, (e) providing a material distribution slot along a bottom portion of the conduit extending from the open free end of the conduit rearwardly for a substantial length of the trailer body to a closed end of the opening adjacent the bulkhead, (f) providing an air outlet opening adjacent a top of the bulkhead to permit air to escape from the interior of the trailer body, (g) installing a first stage coarse filter within the interior of the trailer to filter out and retain a coarse fraction of any of the ground solids material carried toward the air outlet by the air, (h) installing a second stage fine filter down stream of the coarse filter to filter out and retain a relatively finer fraction of any of the ground solids material carried through the first filter with the air toward the air outlet;

transporting the modified trailer to the facility and locating the trailer adjacent the grinder/blower unit;

attaching the free end of the flexible exterior fill tube to the outlet of the grinder/blower unit;

operating the grinder/blower unit to direct a high velocity flow of the ground dry solids material through the fill tube and into the distribution conduit where the material is expelled into the interior of the trailer body through the open end and distribution slot of the conduit in such manner to fill the space within the trailer body progressively from generally front to back with the material;

during filling of the body, allowing any air within the enclosed space to pass consecutively through the coarse and fine filters to filter out any of the solids material carried by the air and discharging the solids-free air out of the trailer body through the air outlet to atmosphere; and after the trailer is determined to be sufficiently full, discontinuing the flow of material into the body, disconnecting the fill tube from the grinder/blower unit, and transporting the trailer to a predetermined unloading site.

14. The method of claim 13 including reconditioning the trailer to accommodate another load of such material by dismounting the fine filter from the bulkhead and replacing it with a clean fine filter.

15. A dry van trailer construction for receiving and transporting flowable dry solids in bulk, comprising:

an elongate dry van trailer body of predetermined length mounted on wheels having top, bottom, side, front and back walls enclosing an interior space of said trailer and having a material inlet formed in said back wall to receive a stream of pneumatically conveyed flowable solids material into said trailer, and an exhaust outlet for venting said interior space of air; and an overhead distribution conduit supported by said trailer body within said interior space adjacent said top wall, said conduit communicating with said inlet for receiving the stream of flowable solids into said conduit and extending longitudinally forwardly therefrom to a free end adjacent said front wall, said conduit having a longitudinal bottom opening extending generally the full length of said trailer body operative to discharge the stream of flowable material from the conduit in such manner as to fill the interior of said trailer progressively from said front wall toward said back wall.

16. A method of pneumatically loading flowable solid material into an enclosed, vented dry van trailer comprising the steps of:

pneumatically conveying a stream of such flowable solid material into an overhead distribution conduit supported by the trailer within an interior space of the trailer extending longitudinally from one end of the trailer to an opposite end thereof; and discharging the stream of material from the distribution conduit into the interior of the trailer through a longitudinal bottom opening of the conduit extending generally the full length of the trailer in order to fill the interior of the trailer with the material progressively from said opposite end toward said one end.

\* \* \* \* \*